(12) United States Patent
Copley et al.

(10) Patent No.: US 11,554,507 B2
(45) Date of Patent: Jan. 17, 2023

(54) ACCESS PORT HAVING A COVER (71) Applicant: Delaware Capital Formation, Inc., Wilmington, DE (US)

(72) Inventors: Joseph David Copley, Shakopee, MN (US); Steven Bruce Williams, II, White Bear Lake, MN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 524 days.

(21) Appl. No.: 16/611,421

(22) PCT Filed: May 8, 2018

(86) PCT No.: PCT/US2018/031644
§ 371 (c)(1),
(2) Date: Nov. 6, 2019

(87) PCT Pub. No.: WO2018/208812
PCT Pub. Date: Nov. 15, 2018

(65) Prior Publication Data
US 2020/0171681 A1    Jun. 4, 2020

Related U.S. Application Data

(60) Provisional application No. 62/503,204, filed on May 8, 2017.

(51) Int. Cl.
*B25J 21/02* (2006.01)
*B08B 15/02* (2006.01)
(Continued)

(52) U.S. Cl.
CPC .............. *B25J 21/02* (2013.01); *B08B 15/026* (2013.01); *G21F 7/005* (2013.01); *G21F 7/047* (2013.01); *A61G 11/009* (2013.01)

(58) Field of Classification Search
CPC .......... B25J 21/02; G21F 7/005; G21F 7/047; B08B 15/026
See application file for complete search history.

(56) References Cited

U.S. PATENT DOCUMENTS

| 4,010,588 A | 3/1977 | Eisert |
| 4,141,609 A | 2/1979 | Eisert |

(Continued)

FOREIGN PATENT DOCUMENTS

| EP | 0720895 | 7/1996 |
| GB | 2216056 | 10/1989 |

(Continued)

OTHER PUBLICATIONS

"Ad System; Glove and Accessory Change System," AD System Principle and Installation, la Calhène 2009 (2 pages).

(Continued)

*Primary Examiner* — James O Hansen
(74) *Attorney, Agent, or Firm* — Pauly, DeVries Smith & Deffner LLC (57) ABSTRACT

A port assembly (100) is generally disclosed that has an annular port ring (110) configured for placement in a barrier wall (10). The annular port ring (110) defines a port opening (20) extending from a first end (22) to a second end (24) and an annular sealing surface (118) about the port opening (20) on the second end (24). A port cover (120) is mechanically coupleable to the annular port ring (110). The port cover (120) defines an annular mating surface (124) configured to couple to the annular sealing surface (118) of the annular port ring (110). A manually actuatable handle (130) is in mechanical communication with the port cover (120). The handle (130) extends from the first end (22) of the annular port ring (110) away from the second end (24).

18 Claims, 11 Drawing Sheets

(51) Int. Cl.
*G21F 7/005* (2006.01)
*G21F 7/047* (2006.01)
*A61G 11/00* (2006.01)

(56) References Cited

U.S. PATENT DOCUMENTS

| | | | |
|---|---|---|---|
| 4,201,310 | A | 5/1980 | Glachet et al. |
| 5,090,782 | A | 2/1992 | Glachet et al. |
| 5,139,318 | A | 8/1992 | Broxup |
| 5,447,699 | A | 9/1995 | Papciak et al. |
| 5,662,581 | A | 9/1997 | Jennrich et al. |
| 5,732,843 | A * | 3/1998 | Glachet .............. G21F 7/005 116/315 |
| 5,735,609 | A | 4/1998 | Norton et al. |
| 5,853,207 | A | 12/1998 | Prioult et al. |
| 5,857,308 | A * | 1/1999 | Dismore .............. G21F 5/12 53/50 |
| 6,089,761 | A | 7/2000 | Sakurai et al. |
| 6,553,722 | B1 | 4/2003 | Porret et al. |
| 6,655,759 | B2 | 12/2003 | Sacca |
| 6,749,808 | B1 | 6/2004 | Huynen et al. |
| 6,779,567 | B1 | 8/2004 | Szatmary et al. |
| 6,835,362 | B1 | 12/2004 | Eriksson et al. |
| 6,849,233 | B2 | 2/2005 | Bushnell et al. |
| 6,958,234 | B2 | 10/2005 | Aicher et al. |
| 6,969,497 | B2 | 11/2005 | Sacca et al. |
| 7,191,670 | B2 | 3/2007 | Aicher et al. |
| 7,282,176 | B2 | 10/2007 | Glachet et al. |
| 7,325,890 | B2 | 2/2008 | Oyama et al. |
| 7,600,726 | B2 | 10/2009 | Mumm et al. |
| 7,678,096 | B2 | 3/2010 | Biddel et al. |
| 7,780,248 | B2 | 8/2010 | Granadino et al. |
| 7,810,528 | B2 | 10/2010 | Netzhammer |
| 8,220,675 | B2 | 7/2012 | Rohard et al. |
| 8,298,054 | B2 | 10/2012 | Hodge et al. |
| 8,746,500 | B2 | 6/2014 | Chevalier et al. |
| 8,790,588 | B2 | 7/2014 | Johansson |
| 8,887,365 | B2 | 11/2014 | Giesen et al. |
| 8,950,624 | B2 | 2/2015 | Sacca |
| 9,884,428 | B2 | 2/2018 | Giesen et al. |
| 2008/0217366 | A1 | 9/2008 | Rohard et al. |
| 2009/0050213 | A1 | 2/2009 | Biddell et al. |
| 2010/0301060 | A1 | 12/2010 | Bernard et al. |
| 2011/0209410 | A1 | 9/2011 | Norton et al. |
| 2012/0015394 | A1 | 1/2012 | Pflanz et al. |
| 2012/0037633 | A1 | 2/2012 | Bernard et al. |
| 2012/0038151 | A1 | 2/2012 | Bernard et al. |
| 2012/0219388 | A1 | 8/2012 | Armau et al. |
| 2012/0267367 | A1 | 10/2012 | Armau et al. |
| 2012/0292311 | A1 | 11/2012 | Armau et al. |
| 2013/0068316 | A1 | 3/2013 | Gueneron et al. |
| 2014/0150924 | A1 | 6/2014 | Nodin et al. |
| 2014/0150926 | A1 | 6/2014 | Nodin et al. |
| 2015/0059144 | A1 | 3/2015 | Fournier et al. |
| 2015/0243392 | A1 | 8/2015 | Fournier |
| 2017/0021510 | A1 | 1/2017 | Guerin |
| 2018/0078930 | A1 | 3/2018 | Williams, III et al. |

FOREIGN PATENT DOCUMENTS

| | | |
|---|---|---|
| GB | 2243103 | 10/1991 |
| JP | 2000193788 | 7/2000 |
| WO | 9824599 | 6/1998 |
| WO | 0002804 | 1/2000 |
| WO | 2010054031 | 5/2010 |
| WO | 2014172665 | 10/2014 |
| WO | 2016112033 | 7/2016 |
| WO | 2016140920 | 9/2016 |
| WO | 2018208812 | 11/2018 |
| WO | 2019079099 | 4/2019 |

OTHER PUBLICATIONS

"Enclosure System Operating Principle," Central Research Laboratories, http://www.centres.com/nuclear/encl/encloper.htm; retrieved Apr. 14, 2008 (2 pages).

"International Preliminary Reporton Patentability," for PCT Application No. PCT/US2016/012219 dated Jul. 20, 2017 (10 pages).

"International Preliminary Reporton Patentability," for PCT Application No. PCT/US2016/020100 dated Sep. 14, 2017 (9 pages).

"International Preliminary Reporton Patentability," for PCT Application No. PCT/US2018/031644 dated Nov. 21, 2019 (9 pages).

"International Search Report and Written Opinion," for PCT Application No. PCT/US2016/012219, dated Apr. 18, 2016 (14 pages).

"International Search Report and Written Opinion," for PCT Application No. PCT/US2016/020100 dated Jun. 22, 2016(12 pages).

"International Search Report and Written Opinion," for PCT Application No. PCT/US2018/031644 dated Aug. 16, 2018 (13 pages).

"International Search Report and Written Opinion," for PCT Application No. PCT/US2018/055419 dated Feb. 12, 2019 (15 pages).

"Pharmaceutical Glove System," Central Research Laboratories, http://www.centres.com/pharm/glove/pharmglv.htm; retrieved Apr. 2, 2008 (2 pages).

"Push-Through Glove Systems; Proven Technology for Containment of Hazardous Environments," Central Research Laboratories Product Catalog, Feb. 2006 (20 pages).

Rael, G. D. et al., "Retrofit of an Engineered Gloveport to a Los Alamos National Laboratory's Plutonium Facility Glovebox," WM2008 Conference, Los Alamos National Laboratory, Los Alamos, NM, Feb. 2008 (9 pages).

"Sealed Pass-Through Enclosure System," Central Research Laboratories, http://www.hellotrade.com/central-research-laboratories/sealed-pass-through-enclosure-system.html; retrieved Apr. 3, 2008 (1 page).

\* cited by examiner

ACCESS PORT HAVING A COVER

This application is being filed as a PCT International Patent application on May 8, 2018 in the name of Delaware Capital Formation, Inc., a U.S. national corporation, applicant for the designation of all countries and Joseph David Copley, a U.S. Citizen and inventor only for the designation of all countries, and Steven Bruce Williams II, a U.S. Citizen, applicant and inventor for the designation of all countries, and claims priority to U.S. Provisional Patent Application No. 62/503,204, filed May 8, 2017, the contents of which are herein incorporated by reference in its entireties.

FIELD

The technology disclosed herein generally relates to an access port. More particularly, the technology disclosed herein relates to an access port having a cover.

BACKGROUND

In various industries it is preferable to work, test, assemble, and the like, in an environment that is isolated from normal ambient conditions. For example, it can be preferable for such activities to be contained in a substantially dirtier environment than the ambient conditions, such as hot cells or laboratories, so inside waste does not substantially affect conditions on the outside. In other examples, such as medical and pharmaceutical applications, it may be preferable for activities to occur in a substantially cleaner environment, where outside debris and bacteria cannot substantially affect conditions in the clean environment. A sealed containment system having an access port facilitates the performance of work within an enclosure. For example, an operator outside of the enclosure can extend a hand and arm through a glove sealed in an access port (also known as a "glove port") in a barrier wall of the enclosure. As another example, items can be transferred into the containment system through an access port (also known as a "transfer port") in the barrier wall.

SUMMARY

In some embodiments, the technology disclosed herein relates to a port assembly having an annular port ring configured for placement in a barrier wall. The annular port ring defines a port opening extending from a first end to a second end and an annular sealing surface about the port opening on the second end. A port cover is mechanically coupleable to the annular port ring, wherein the port cover defines an annular mating surface configured to couple to the annular sealing surface of the annular port ring. A manually actuatable handle is in mechanical communication with the port cover, where the handle extends from the first end of the annular port ring away from the second end.

In some embodiments, the second end is configured to be positioned in an isolated environment and the first end is configured to be positioned outside of the isolated environment.

In addition or alternatively, the annular port ring defines an axle pathway from the first end to the second end and the handle has an axle disposed in the axle pathway. In some such embodiments the axle is coupled to the port cover and the axle is rotatably disposed in the axle pathway. In addition or alternatively, the axle can be linearly translatable along the axle pathway. In addition or alternatively, the handle further has a linearly compressible spring disposed in the axle pathway, wherein the spring mechanically couples the handle and the annular port ring to bias the handle away from the second end. In addition or alternatively, the annular port ring has a translation pin extending into the axle pathway. In addition or alternatively, the axle defines a ledge, where the translation pin and the ledge are configured to interfere to obstruct linear translation of the handle away from the second end. In addition or alternatively, the ledge and the translation pin are configured to interfere to prevent the port cover from pivoting relative to the annular port ring. In addition or alternatively, the annular sealing surface and the annular mating surface mutually define mating alignment features. In addition or alternatively, the alignment features comprise a coupling pin and a pin receptacle. In addition or alternatively, the port cover is pivotable relative to the annular port ring. In addition or alternatively, the handle has an axle having a first axle portion and a second axle portion, and wherein the first axle portion is detachable from the second axle portion.

Some other embodiments are directed to a method of uncovering a port. An axle of a manually actuatable handle is linearly translated through an annular port ring towards an isolated environment. An annular mating surface of a port cover is uncoupled from an annular sealing surface of an annular port ring in response to linearly translating the manually actuatable handle. The manually actuatable handle is rotated about its axle. The port cover is pivoted relative to the annular port ring in response to rotating the manually actuatable handle. The rotated manually actuatable handle is released to secure the pivoted port cover.

In some embodiments the manually actuatable handle is rotated between 90 and 270 degrees. In addition or alternatively, uncoupling the annular mating surface from the annular sealing surface involves disengaging mating alignment features mutually defined by the annular sealing surface and the annular mating surface. In addition or alternatively, pivoting the port cover clears the port opening defined by the annular port ring. In addition or alternatively, releasing the rotated manually actuatable handle results in a spring linearly translating the axle of the manually actuatable handle through the annular port ring away from the isolated environment. In addition or alternatively, the annular port ring interferes with the axle to obstruct linear translation of the axle away from the isolated environment beyond a defined distance. In addition or alternatively, linearly translating the axle of a manually actuatable handle through an annular port ring towards an isolated environment comprises compressing a spring between the handle and the annular port ring. In addition or alternatively, a first axle portion of the manually actuatable handle is detached from a second axle portion of the manually actuatable handle. In addition or alternatively, a first axle portion of the manually actuatable handle is attached to a second axle portion of the manually actuatable handle. Other examples are also described.

BRIEF DESCRIPTION OF THE DRAWINGS

The current technology may be more completely understood and appreciated in consideration of the following detailed description of various embodiments of the current technology in connection with the accompanying drawings.

DETAILED DESCRIPTION

The technology disclosed herein generally relates to a port assembly having an annular port ring defining the port opening. The port assembly has a port cover and a manually actuatable handle in mechanical communication with the port cover. The port assembly is configured, in part, to allow a user to manipulate the handle to position the port cover to selectively sealingly obstruct the port opening of the annular port ring. In a variety of embodiments the port cover is configured to be located in the isolated environment, but it can be positioned relative to the annular port ring by a user via the handle located in the outside environment. The handle is generally manually actuatable and in mechanical communication with the port cover. The handle extends from the first end of the annular port ring towards and beyond the second end of the annular port ring. In various embodiments consistent with the current technology, it can be desirable to relocate the handle when not in use such that the annular port ring is fully accessible to a user.

Figure 1:
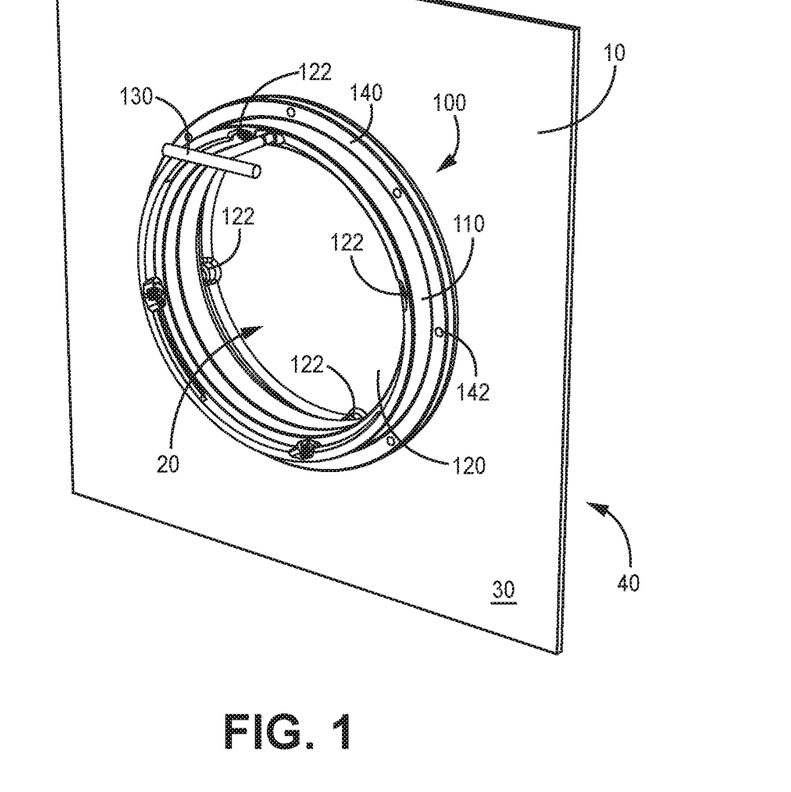
FIG. 1 is a perspective view of an example access port consistent with example implementations of the technology disclosed herein, shown as viewed from an outside environment in one example application.
Figure 2:
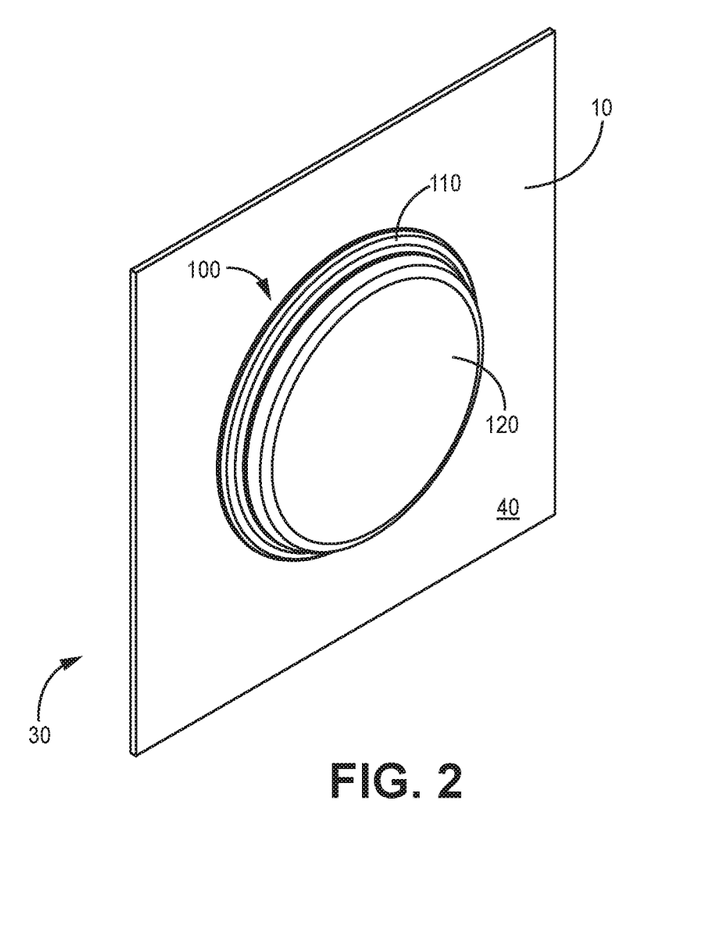
FIG. 2 is another perspective view of an example access port shown as viewed from an isolated environment in one example application.
Figure 3:
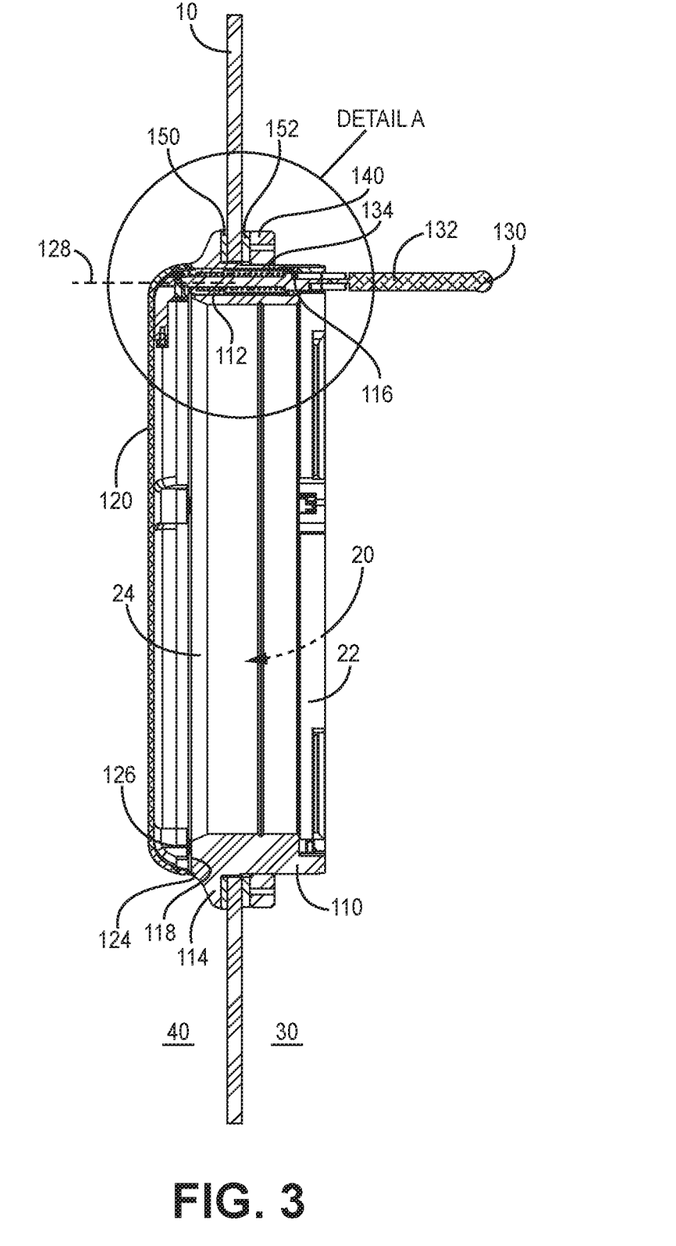
FIG. 3 is a cross-sectional view of the example access port depicted in FIGS. 1-2.

FIG. 1 is a cross-sectional view of a port assembly 100 consistent with example implementations of the technology disclosed herein, FIG. 2 is another perspective view of the example port assembly 100, and FIG. 3 is a cross-sectional view of the example port assembly 100. A port opening 20 is defined in a barrier wall 10 of an isolated environment. The isolated environment 40 can be a glovebox, in some examples. FIG. 1 is a perspective view of the port assembly 100 from the outside environment 30, and FIG. 2 is a perspective view of the port assembly 100 from the isolated environment 40.

The port assembly 100 is disposed in the barrier wall 10. In some embodiments the port assembly 100 is configured to sealably receive an access element (not currently depicted), which provides a user—who is in the outside environment 30 outside of the isolated environment 40—access to the inside of the isolated environment 40 through the barrier wall 10 without contamination of either the outside environment 30 from the isolated environment 40 or of the isolated environment 40 from the outside environment 30. In some embodiments the access element will have a glove. In some other embodiments the access element can define a window through which the interior of the isolated environment can be viewed. In some embodiments the access element is a plug sealably disposed in the barrier wall. In some embodiments the access element can be a mechanical (including hydraulic and/or pneumatic) or electrical pass-through cords or wires that sealably extend into the isolated environment from the outside environment 30. In some other embodiments the access element is a transfer port configured to sealably receive a sealed container (not currently depicted) that is configured to contain items to be transferred into and/or out of the isolated environment 40 without exposing the items to the outside environment 30.

The port assembly 100 generally has an annular port ring 110 defining the port opening 20, a port cover 120, and a manually actuatable handle 130 in mechanical communication with the port cover 120. The port assembly 100 is configured, in part, to allow a user to manipulate the handle 130 to position the port cover 120 to selectively sealingly obstruct the port opening 20 of the annular port ring 110. The annular port ring 110 is generally configured for placement in the barrier wall 10. In the current embodiment, the annular port ring 110 extends from within isolated environment 40 through the barrier wall 10 and into the outside environment 30. The annular port ring 110 mutually defines the port opening 20 extending from a first end 22 to a second end 24 of the annular port ring 110. The inner annular surface of the annular port ring 110, which abuts the port opening 20, is configured to sealably receive an access element to provide access to the isolated environment 40. The first end 22 can be configured to be positioned in the outside environment and the second end 24 can be configured to be positioned in the isolated environment. The annular port ring 110 generally defines an annular sealing surface 118 about the port opening 20 on the second end 24, which will be described in more detail herein.

The annular port ring 110 can generally be constructed of a variety of materials, any of which are currently used in the art such as stainless steel, aluminum, plastics, and so on. Commonly a 300 series stainless steel is used. The various surfaces of the annular port ring 110 can define one or more grooves that are configured to receive sealing materials to define one or more sealing structures. "Sealing materials" disclosed herein is generally defined to mean any material that can be used to form a seal between rigid components such as an o-ring, flat gasket, silicone potting compound, and the like. In the current example embodiment, an annular sealing ring 150 is disposed between the barrier wall 10 and a radial flange 114 extending from the annular port ring 110. A backing ring 152 is disposed between the barrier wall 10 and a sealing nut 140 of the annular port ring 110. The backing ring 152 is configured to distribute pressure from the sealing nut 140 onto the barrier wall 10. The sealing nut 140 is disposed on an outer annular surface of the annular port ring 110 and is configured to apply compressive force to the barrier wall 10 to fix the position of the annular port ring 110 relative to the barrier wall 10. A radial surface of the sealing nut 140 can define one or more openings 142 that are each configured to receive a fastening component, such as a set screw, to secure the radial position of the sealing nut 140. The port cover 120 is configured to selectively and sealably obstruct the port opening 20 defined by the annular port ring 110. The port cover 120 is generally mechanically coupleable to the annular port ring 110. In some embodiments, the port cover 120 is pivotable relative to the annular port ring 110. The port cover 120 defines an annular mating surface 124 configured to couple to the annular sealing surface 118 of the annular port ring 110. In some embodiments the port cover 120 and the annular port ring 110 define mating alignment features 126, which will be described in more detail. In a variety of embodiments, the port cover 120 and the annular port ring 110 are configured to form a seal when the port cover 120 is coupled to the annular port ring 110.

In a variety of embodiments the port cover 120 is configured to be located in the isolated environment 40, but it can be positioned relative to the annular port ring 110 by a user via the handle 130 located in the outside environment 30. The handle 130 is generally manually actuatable and in mechanical communication with the port cover 120. The handle 130 extends from the first end 22 of the annular port ring 110 towards and beyond the second end 24 of the annular port ring 110.

Figure 4:
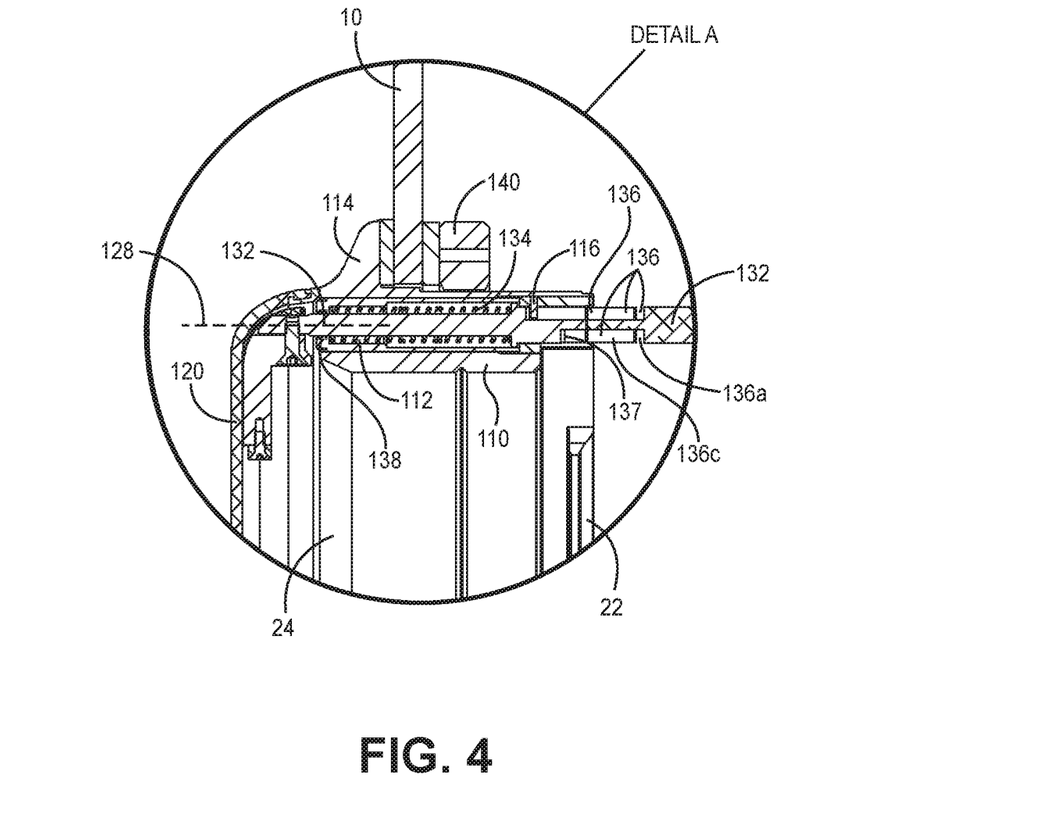
FIG. 4 is a detail view of FIG. 3.

In the current embodiment, the handle 130 has an axle 132 that is fixed to the port cover 120, particularly visible in FIG. 4, which is a detail view of Detail A in FIG. 3. The axle 132 extends through an axle pathway 112 defined by the annular port ring 110. The axle pathway 112 extends from the first end 22 to the second end 24 of the annular port ring 110. In a variety of embodiments the axle 132 is rotatably disposed in the axle pathway 112. In some such embodiments, the axle 132 defines a pivot axis 128 of the port cover 120, which defines the axis of rotation of the port cover 120. While in the current embodiment, the axle 132 and the pivot axis 128 are co-linear, such a configuration is not always the case. In some embodiments the axle 132 and the pivot axis 128 are parallel. In some other embodiments the axle 132 and the pivot axis 128 are perpendicular. In various embodiments rotation of the handle 130 is configured result in equal rotation of the port cover 120. For example, if the handle is rotated by 90 degrees in a first direction, then the port cover is also rotated by 90 degrees in the same direction.

In some embodiments, including the one depicted, the axle 132 is linearly translatable along the axle pathway 112. Linear translation of the handle 130 results in equal linear translation of the axle 132, which results in equal linear translation of the port cover 120. The axle 132 can have a linearly compressible spring 134 disposed in the axle pathway 112 to bias the axle 132, and therefore the port cover 120, in a particular position relative to the annular port ring 110. For example, in some embodiments the spring 134 mechanically couples the axle 132 and the annular port ring 110 to bias the axle 132 away from the second end 24 of the annular port ring 110. As a result, the spring 134 can bias the port cover 120 to be in sealing contact with the annular port ring 110. Linearly translating the axle 132 of a manually actuatable handle 130 through an annular port ring 110 towards an isolated environment 40 compresses the spring 134 between the handle 130 and the annular port ring 110. For example, if the handle 130 is translated linearly by 2 inches, the port cover 120 is also translated linearly by 2 inches in the same direction.

In a variety of embodiments at least one seal 138 is disposed in the axle pathway 112 to form a seal between the axle 132 and the annular port ring 110. The seal 138 is generally a sealing material (defined above) configured to prevent contamination between the isolated environment 40 and the outside environment 30 through the axle pathway 112. The seal 138 is generally configured to form a seal between the axle 132 and the annular port ring 110 in all positions of the handle 130 achieved through linear translation and rotation. In the currently-depicted embodiment one seal 138 is disposed in the axle pathway 112 towards the second end 24 of the annular port ring 110. In some other embodiments the seal can be disposed in the axle pathway 112 between the first end 22 and the second end 24 of the annular port ring 110.

When the port cover 120 is in a closed position—where a "closed position" means that the port cover 120 forms a seal with the annular port ring 110 around the port opening 20—the annular port ring 110 obstructs linear translation of the port cover 120 towards the outside environment 30, which thereby obstructs linear translation of the axle 132 and the handle 130 away from the isolated environment 40. When the port cover 120 is in a closed position, the spring 134 is in a state of compression to bias the port cover 120 in sealing contact with the annular port ring 110. To remove the port cover 120 from sealing contact with the annular port ring 110, the force exerted by the spring 134 is overcome to translate the axle 132 through the axle pathway 112 towards the isolated environment, thereby translating the port cover 120 away from the annular port ring 110. The axle 132 can be translated by a user translating the handle 130 towards the isolated environment 40.

In the current embodiment the translation of the axle 132 through the axle pathway 112 relative to the annular port ring 110 is defined by a translation pin 116 translatably disposed in an axle track 136. The translation pin 116 is defined by the annular port ring 110. The translation pin 116 extends radially into the axle pathway 112 and into the axle track 136. The axle track 136 is defined by the axle 132. The axle track 136 defines a translation pathway for the translation pin 116, thereby limiting the translation of the axle 132 relative to the annular port ring 110. In some alternate embodiments, the translation pin can be defined by the axle 132 and the axle track can be defined by the annular port ring 110 along the axle pathway 112.

Figure 5:
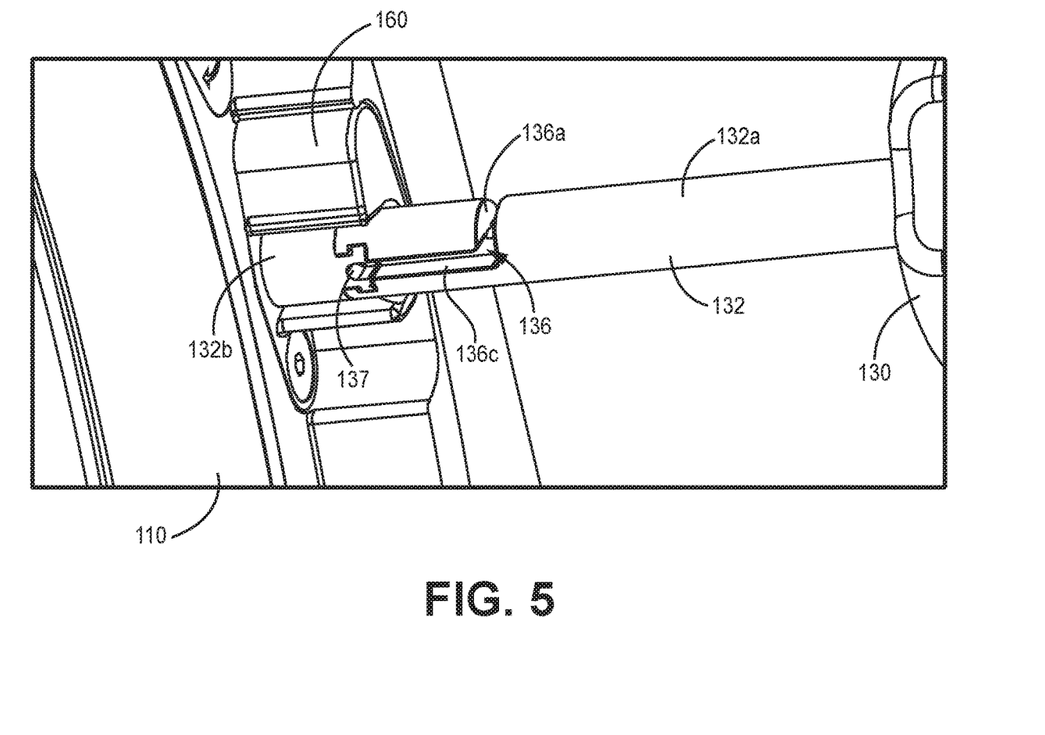
FIG. 5 is a perspective view of FIG. 4.

FIG. 5, which is a perspective view of the axle track 136 defined by the axle 132 can be viewed in conjunction with FIG. 4 for clarity. The axle track 136 has three segments in the current embodiment: a rotational track 136a, a sealing track 136b (not visible in FIG. 5) and an opening track 136c. The sealing track 136b and the opening track 136c each define a linear translation pathway for the translation pin 116 thereby allowing linear translation of the axle 132 relative to the axle pathway 112 when the translation pin 116 is radially aligned with the respective track 136b, 136c. The rotational track 136a defines a radial translation pathway for the translation pin 116 thereby allowing rotation of the axle 132 relative to the axle pathway 112 when the translation pin 116 is linearly aligned with the axle pathway 136a.

When the port cover 120 is in a closed position, such as in FIGS. 4 and 5, the translation pin 116 is positioned in the sealing track 136b. When the port cover 120 is in an open position, the translation pin 116 is positioned in the opening track 136c, which will be described in more detail with respect to FIG. 8. When the port cover 120 is translated from a closed position to an open position, the axle 132 is translated along the axle pathway 112 such that the translation pin 116 is translated along the sealing track 136b into linear alignment with the rotational track 136a. The axle 132 is then rotated to translate the translation pin 116 along the rotational track 136a into radial alignment with the opening track 136c, and the axle 132 is translated along the axle pathway 112 such that the translation pin 116 is translated along the opening track 136c to a ledge 137 that can define the end of the opening track 136c.

Figure 6:
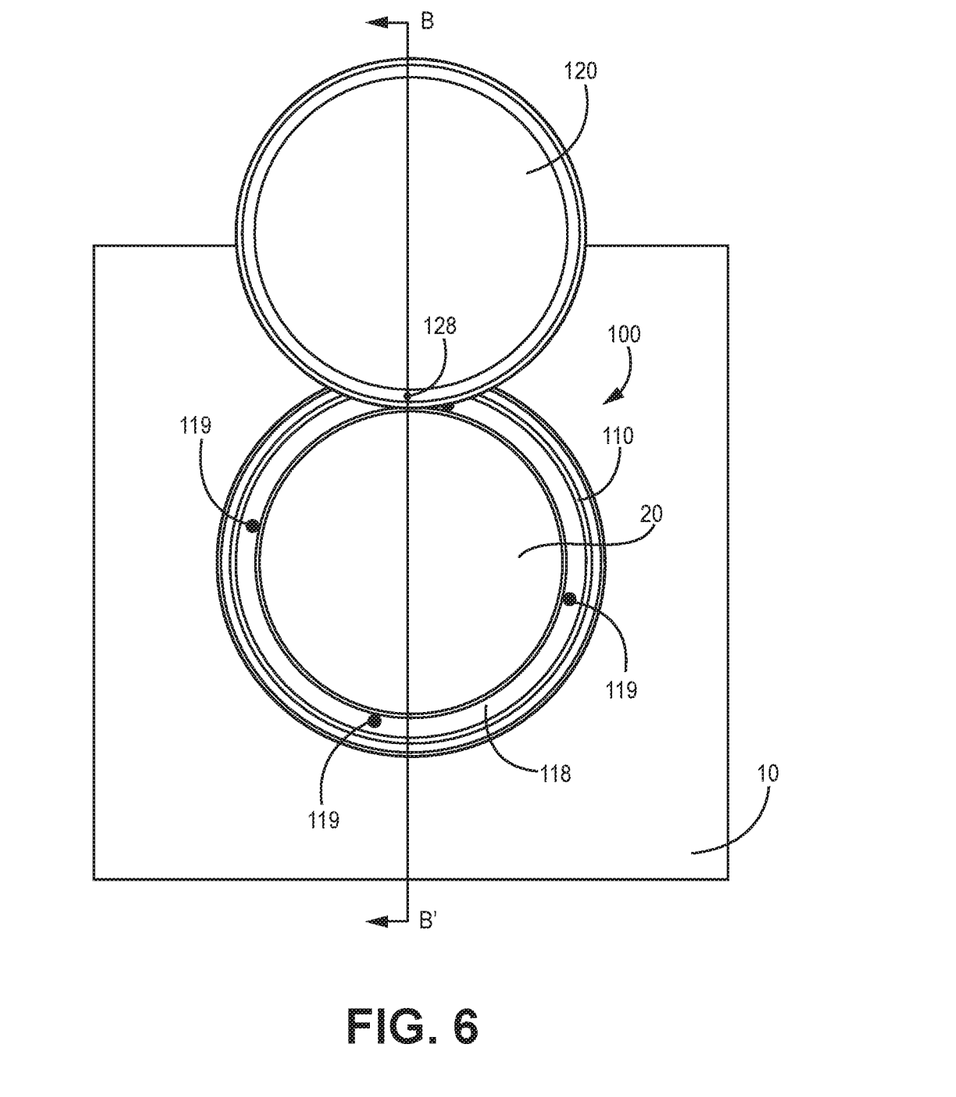
FIG. 6 is facing view of an example access port consistent with the technology disclosed herein.
Figure 7:
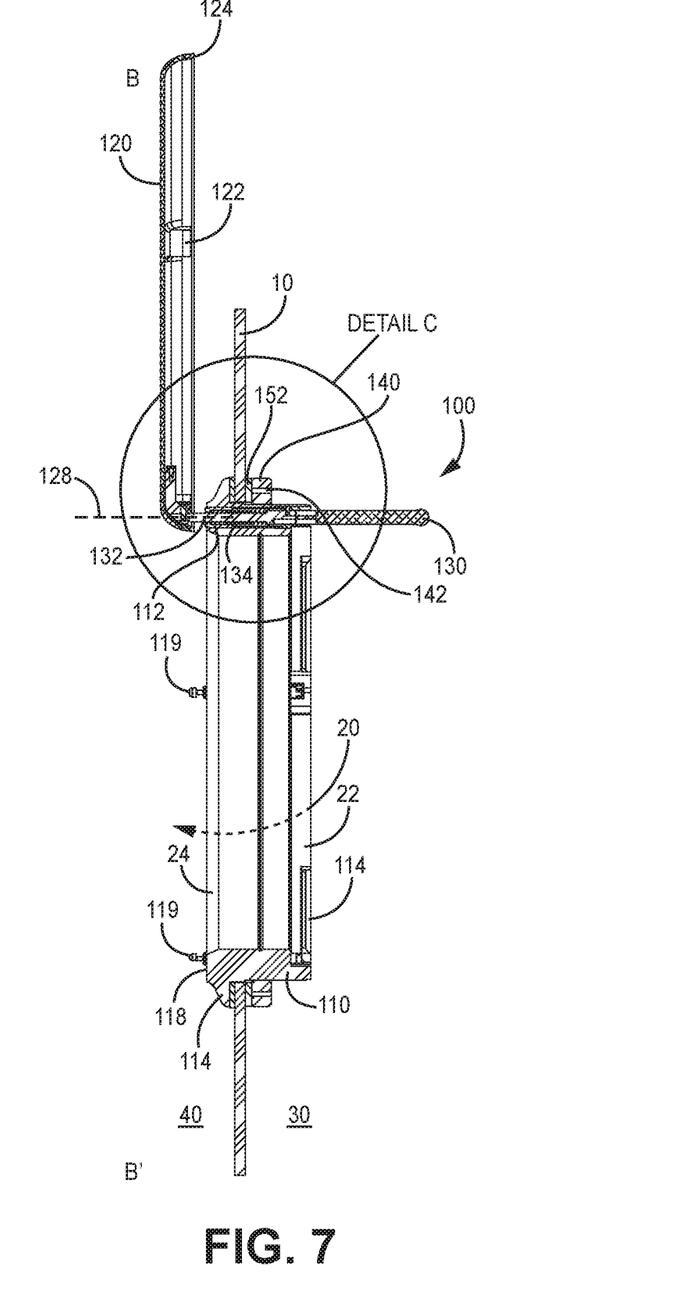
FIG. 7 is a cross-sectional view of the example access port depicted in FIG. 6.

In FIGS. 1-5 the port cover 120 is shown in a closed position. FIGS. 6 and 7 depict the port cover 120 in an open position, where "open position" means that the port cover 120 clears the port opening 20 such that the port opening 20 can be used to access the isolated environment 40. FIG. 6 is a facing view of the port assembly 100 from the isolated environment 40 and FIG. 7 is a cross-sectional view of the port assembly 100 through line B-B' of FIG. 6.

The annular sealing surface 118 of the annular port ring 110 is more clearly visible in FIGS. 6 and 7. The annular sealing surface 118 is defined on the second end 24 of the annular port ring 110 around the port opening 20. The annular sealing surface 118 is configured to couple with the annular mating surface 124 of the port cover 120. In various embodiments a sealing material is disposed on one or both of the annular sealing surface 118 and the annular mating surface 124 to form a seal between the annular sealing surface 118 and the annular mating surface 124. One or both of the annular mating surface 124 and the annular sealing surface 118 can define a ridge, an indentation, or a planar surface that is configured to contact the sealing material.

As mentioned earlier, the annular port ring 110 and the port cover 120 mutually define mating alignment features 126 (collectively referenced in FIG. 3), that are individually referenced in FIG. 7 (119, 122). The mating alignment features 126 are generally configured to ensure proper alignment between the annular port ring 110 and the port cover 120 when the port cover 120 is in the closed position, which can ensure proper sealing between the annular port ring 110 and the port cover 120. In the current embodiment, the mating alignment features 126 are one or more coupling pins 119 and corresponding pin receptacles 122. While the coupling pins 119 are currently defined by the annular port ring 110 and the corresponding pin receptacles 122 are defined by the port cover 120, in some embodiments the coupling pins can be defined by the port cover and the corresponding pin receptacles can be defined by the annular port ring.

Alternate configurations of mating alignment features 126 can be used. For example, ridges defined by one of the annular port ring or the port cover can be configured to align with mating grooves defined by the other one of the annular port ring or the port cover. The mating alignment features 126 can also be a combination of different mating structures mutually defined by the annular port ring 110 and the port cover 120.

Consistently with some embodiments, including those depicted herein, to re-position the port cover 120 from a closed position to an open position, the port cover 120 is linearly translated to uncouple the annular mating surface 124 of the port cover 120 from the annular sealing surface 118 of the annular port ring 110. Uncoupling the annular mating surface 124 and the annular sealing surface 118 can involve disengaging the mating alignment features 126 (FIG. 3) mutually defined by the annular sealing surface 118 and the annular mating surface 124. To linearly translate the port cover 120, the handle 130 is linearly translated towards the isolated environment 40, which linearly translates the axle 132 through the annular port ring 110 towards the isolated environment 40. The linear translation of the port cover 120 will generally be sufficient to prevent interference between the annular port ring 110 and the port cover 120, such as between the mating alignment features 126 (FIG. 3), during the subsequent rotation of the port cover 120 over the port opening. In at least one embodiment, the port cover 120 is translated at least one centimeter from the annular sealing surface 118 of the annular port ring 110 to prevent interference between the annular port ring 110 and the port cover 120 during rotation of the port cover 120, although in some other embodiment the port cover is translated less than one centimeter from the annular sealing surface 118 of the annular port ring 110.

When the annular sealing surface and the annular mating surface are uncoupled, the port cover 120 is pivoted relative to the annular port ring 110 to a sufficient degree to clear the port opening 20 of the port cover 120. The port cover 120 pivots relative to the annular port ring 110 in response to rotating the manually actuatable handle 130 and the axle 132. As previously described, the port cover 120 is pivoted around its pivot axis 128, which is defined by the axle 132. In some embodiments, the handle 130 is rotated between 160 and 200 degrees. In some embodiments, the handle 130 is rotated 180 degrees. In some embodiments, the handle is rotated more or less than 180 degrees such that the port cover 120 is clear of the port opening 20.

Once clear of the port opening 20 the port cover 120 can be secured in position so that the port opening 20 can be used. In a variety of embodiments, the pivoted port cover 120 is secured in position by a user releasing the manually actuatable handle 130, which will be described in more detail with reference to FIG. 8.

Figure 8:
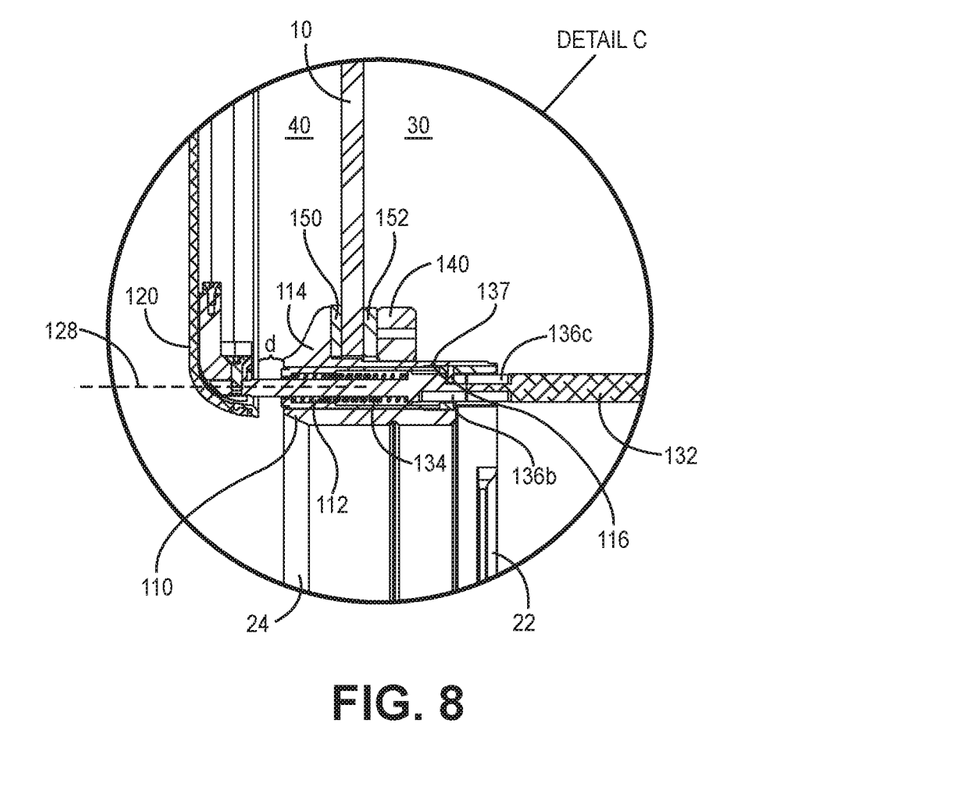
FIG. 8 is a detail view of FIG. 7.
Figure 9:
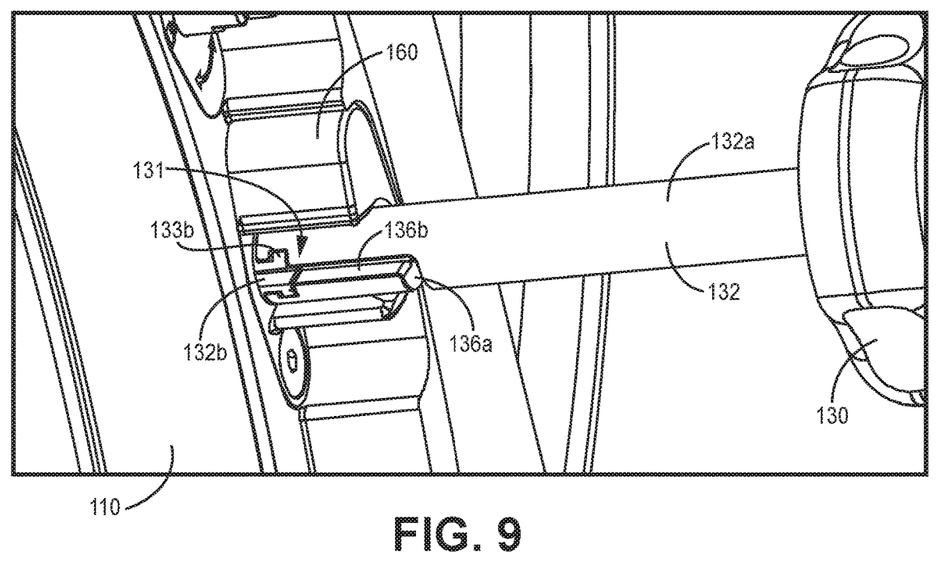
FIG. 9 is a perspective view of FIG. 8.

FIG. 8 is a detail view of Detail C of FIG. 7, and FIG. 9 is a perspective view of the axle 132 of FIG. 8, which can be viewed in conjunction with FIG. 8 for clarity. Compared to FIG. 4, the port cover 120, the axle 132, and the handle 130 have been translated linear distance d towards the isolated environment 40. Also compared to FIG. 4, the handle 130, the port cover 120, and the axle 132 are rotated about 180 degrees about pivot axis 128. That rotation of the axle 132 results in linear alignment between the ledge 137 and the translation pin 116. As described above with reference to FIGS. 4 and 5, in some embodiments such rotation of the axle 132 results in radial alignment between an opening track 136c and the translation pin 116. In such a configuration, the opening track 136c and the ledge 137 are in linear alignment.

When the rotated handle 130 is released by a user, the spring 134 linearly translates the axle 132 of the handle 130 through the annular port ring 110 away from the isolated environment 40 and towards the outside environment 30 until the translation pin 116 of the annular port ring 110 and the ledge 137 interfere to obstruct the linear translation of the axle 132 away from the isolated environment 40 beyond a defined distance. In some embodiments the ledge 137 and the translation pin 116 also interfere to prevent the handle 130, and therefore the port cover 120, from pivoting relative to the annular port ring 110. For example, the ledge 137 can be the end of an opening track 136c that engages the translation pin 116. As another example, the translation pin 116 can define a track that engages the ledge 137. In embodiments where the ledge 137 and the translation pin 116 interfere to prevent the port cover 120 from pivoting, the force of the spring 134 is configured to resist linear translation of the axle 132 that would disengage the ledge 137 and the translation pin 116. In some embodiments the force of the spring 134 causes pressure and friction between the ledge 137 and the translation pin 116 which can prevent the port cover 120 from pivoting back to a closed position under the force of gravity. In a variety of embodiments, the axle 132 and the annular port ring 110 define an interference structure 137, 116 when the port cover 120 is in an open position. The open position can be 90-270 degrees from the closed position relative to the pivot axis 128. In a variety of embodiments the interference structure 137, 116 is configured to prevent rotation of the port cover 120 to a closed position under the force of gravity.

It is noted that, while the embodiments depicted herein show a port assembly 100 with a handle 130 having an axle 132 extending through an axle pathway 112 defined towards a top portion of the annular port ring 110, in some embodiments the axle pathway 112 can be defined at a different radial location in the annular port ring 110. For example, the axle pathway could be defined towards a bottom portion or towards one side of the annular port ring. Such a change in configuration can modify the forces required to secure the port cover in a particular position relative to the port ring.

Figure 10:
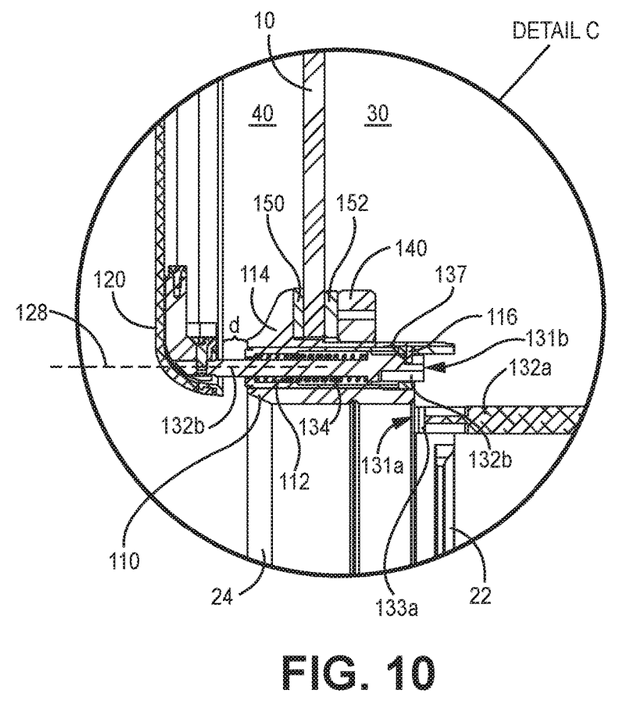
FIG. 10 depicts functionality associated with some embodiments consistent with FIG. 8.
Figure 11:
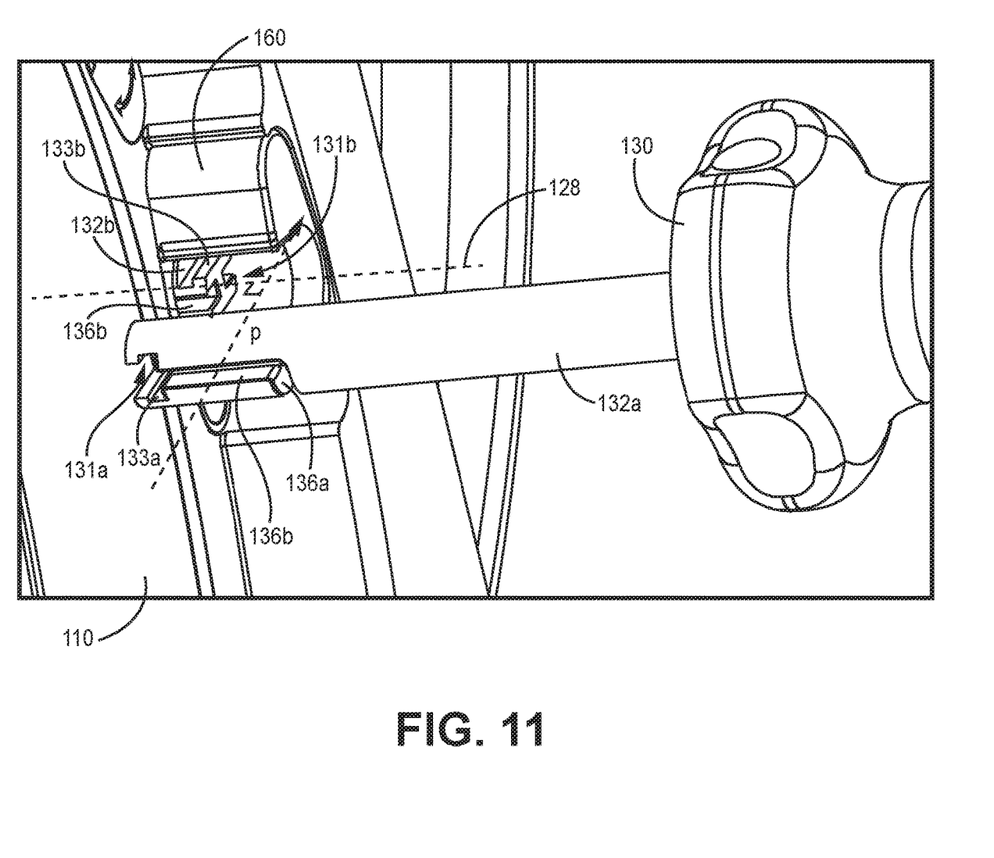
FIG. 11 is a perspective view of FIG. 10.

In various embodiments consistent with the current technology, it can be desirable to relocate the handle 130 when not in use such that the annular port ring 110 is fully accessible to a user. In some embodiments, the handle 130 can define a joint by which a user can pivot the handle outward to be parallel to the barrier wall 10. In another embodiment the handle 130 can be detached from the port cover assembly and reattached for opening or closing the port cover 120. FIG. 10 depicts an example implementation of such an embodiment, which is consistent with the embodiment depicted in FIG. 8. FIG. 11 is a perspective view of the scenario depicted in FIG. 10.

In FIGS. 10 and 11 the handle 130 has been detached from the port cover assembly by detaching a first portion of the axle 132a from a second portion of the axle 132b. The first portion of the axle 132a and the second portion of the axle 132b mutually engage and disengage via a connection structure 131. In particular, the first axle portion 132a has a first connection structure 131a and the second axle portion 132b has a second connection structure 131b that slidably receive each other. The first connection structure 131a can define a channel 133a that is configured to slidably receive a ridge 133b defined by the second connection structure 131b. In some embodiments the channel 133a slidably receives the ridge 133b in a direction p perpendicular to the pivot axis 128.

In some embodiments, including the one currently depicted, the handle 130 can be detached from the port cover assembly when the port cover 120 is in a closed position and when the port cover 120 is in an open position relative to the annular port ring 110. In such embodiments, the handle 130 cannot be detached from the port cover assembly when the port cover 120 is in an intermediate position between the open position and the closed position. For example, in the current embodiment, the first portion of the axle 132a is detached from the second portion of the axle 132b by sliding the first portion 132a in a first direction, where the first direction is defined by a shroud 160 that obstructs sliding the first portion 132a relative to the second portion 132b in any other direction. In embodiments consistent with the current example, the first portion of the axle 132a is attached to the second portion of the axle 132b by sliding the first portion 132a onto the second portion 132b in a second direction that is opposite the first direction. The shroud 160 can be configured to obstruct sliding of the first portion 132a onto the second portion 132b beyond the point where the first portion 132a and the second portion 132b are fully coupled.

In embodiments consistent with the examples depicted in FIGS. 10-11, the first portion of the axle 132a and the second portion of the axle 132b mutually define the axle track 136. In particular, the first portion of the axle 132a and the second portion of the axle 132b each define a portion of the sealing track 136b and the opening track 136c. The second portion of the axle 132b defines the ledge 137 towards one end of the opening track 136c (FIG. 5) and one end portion of the sealing track 136b (FIG. 10). The first portion of the axle 132a defines the rotational track 136a (FIG. 11) and the other end portions of each of the opening track 136c (FIG. 5) and the sealing track 136b (FIG. 11). The sealing track 136b extends from the first portion of the axle 132a into the second portion of the axle 132b (FIG. 11). Similarly, the opening track 136c extends from the first portion of the axle 132a into the second portion of the axle 132b (FIG. 5).

Figure 12:
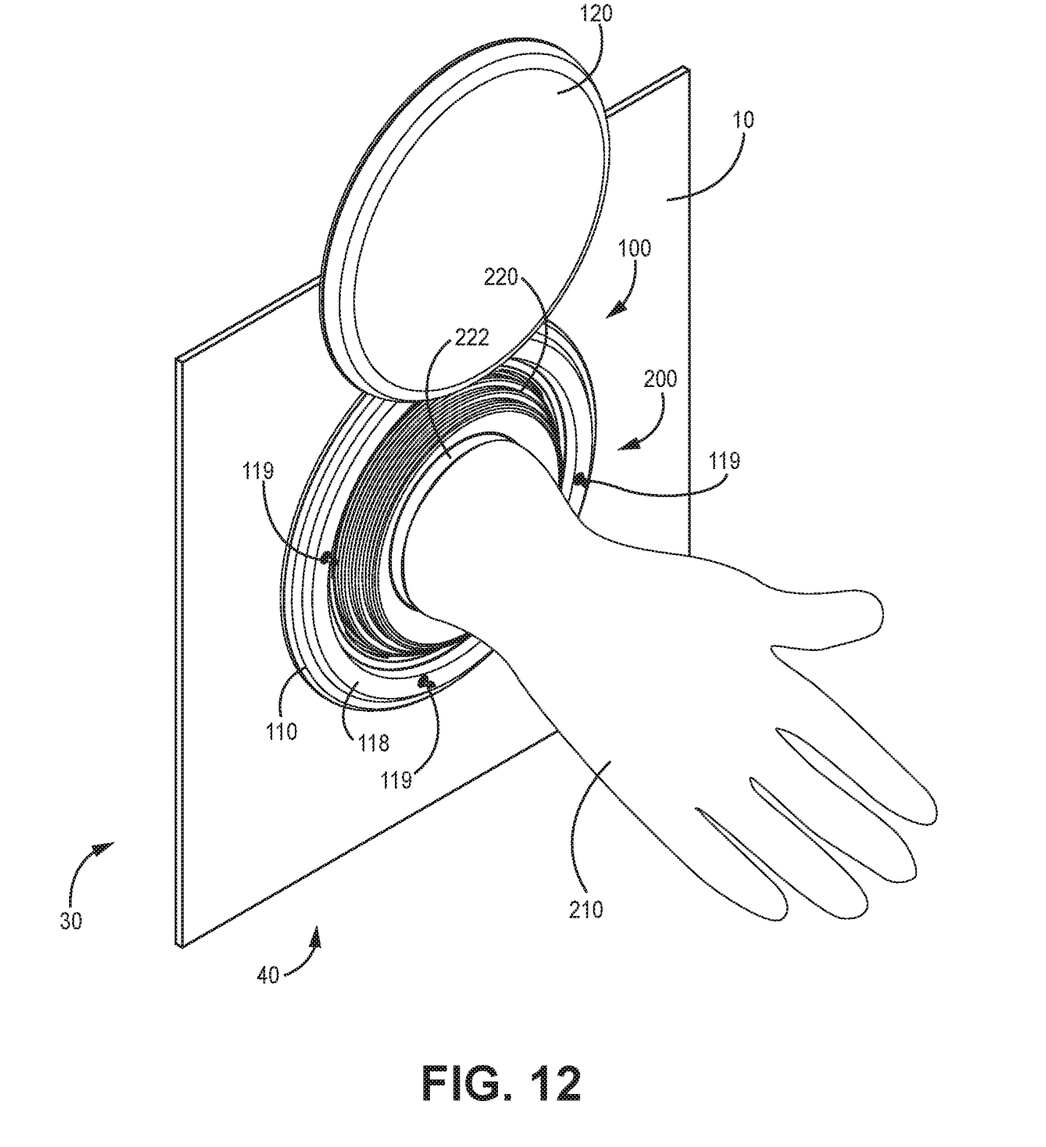
FIG. 12 is a perspective view of another example access port consistent with the technology disclosed herein.

FIG. 12 depicts a perspective view of example implementation consistent with some embodiments of the technology disclosed herein. The perspective view is from an isolated environment 40. A port assembly 100 having a port cover 120 is generally consistent with the technology described herein above. An annular port ring 110 is disposed in the barrier wall 10 and the port cover 120 is configured to couple to the annular port ring 110 at an annular sealing surface 118 about a port opening (not visible) defined by the annular port ring 110. One or more alignment features 119 extend from the annular sealing surface 118 that are configured to engage mating alignment features (not visible) on the port cover 120. The port cover 120 is in an open position relative to the annular port ring 110.

In the current embodiment an access element 200 is installed in the annular port ring 110. The access element 200 is generally configured to provide a user the ability to access the isolated environment 40 from the outside environment 30 through the barrier wall 10. Here the access element 200 has a glove 210 that is sealably coupled to the annular port ring 110. In particular, the glove 210 is sealably coupled to a sleeve 220 that is sealably coupled to the annular port ring 110. In some embodiments the sleeve is omitted. The access element 200 can have a variety of configurations, but in the current embodiment the sleeve defines a tubular accordion shape that extends from the annular port ring 110 to a cuff 222 that is sealably coupled to the open end of the glove 210. In some embodiments, the glove 210 is a substantially impermeable flexible material such as neoprene. When the port assembly 100 is in use, a user can insert a hand through the sleeve 220 and into the glove 210 for accessing the isolated environment 40.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:

1. A port assembly comprising:
   an annular port ring configured for placement in a barrier wall, the annular port ring defining a port opening extending from a first end to a second end and an annular sealing surface about the port opening on the second end;
   a port cover mechanically coupleable to the annular port ring, wherein the port cover defines an annular mating surface configured to couple to the annular sealing surface of the annular port ring; and
   a manually actuatable handle in mechanical communication with the port cover, where the handle extends from the first end of the annular port ring away from the second end;
   wherein the annular port ring defines an axle pathway from the first end to the second end and the handle comprises an axle disposed in the axle pathway, wherein the axle is coupled to the port cover and the axle is rotatably disposed in the axle pathway, wherein the axle is linearly translatable along the axle pathway; and wherein the handle further comprises a linearly compressible spring disposed in the axle pathway, wherein the spring mechanically couples the handle and the annular port ring to bias the handle away from the second end.

2. The port assembly of claim 1, wherein the annular port ring further comprises a translation pin extending into the axle pathway.

3. The port assembly of claim 2, wherein the axle defines a ledge, wherein the translation pin and the ledge are configured to interfere to obstruct linear translation of the handle away from the second end.

4. The port assembly of claim 3, wherein the ledge and the translation pin are configured to interfere to prevent the port cover from pivoting relative to the annular port ring.

5. The port assembly of claim 1, wherein the annular sealing surface and the annular mating surface mutually define mating alignment features.

6. The port assembly of claim 5, wherein the alignment features comprise a coupling pin and a pin receptacle.

7. The port assembly of claim 1, wherein the second end is configured to be positioned in an isolated environment and the first end is configured to be positioned outside of the isolated environment.

8. The port assembly of claim 1, wherein the port cover is pivotable relative to the annular port ring.

9. The port assembly of claim 1, wherein the handle comprises an axle having a first axle portion and a second axle portion, and wherein the first axle portion is detachable from the second axle portion.

10. A method of uncovering a port assembly comprising:
linearly translating an axle of a manually actuatable handle through an annular port ring towards an isolated environment,
wherein the annular port ring is configured for placement in a barrier wall, the annular port ring defining a port opening extending from a first end to a second end and an annular sealing surface about the port opening on the second end,
wherein the manually actuatable handle is in mechanical communication with a port cover, where the handle extends from the first end of the annular port ring away from the second end;
uncoupling an annular mating surface of a port cover from the annular sealing surface of the annular port ring in response to linearly translating the manually actuatable handle; wherein the annular sealing surface and the annular mating surface mutually define mating alignment features, wherein the alignment features comprise a coupling pin and a pin receptacle;
rotating the manually actuatable handle about its axle;
pivoting the port cover relative to the annular port ring in response to rotating the manually actuatable handle; and releasing the rotated manually actuatable handle to secure the pivoted port cover.

11. The method of claim 10, wherein the manually actuatable handle is rotated between 90 and 270 degrees.

12. The method of claim 10, wherein uncoupling the annular mating surface from the annular sealing surface comprises disengaging mating alignment features mutually defined by the annular sealing surface and the annular mating surface.

13. The method of claim 10, wherein pivoting the port cover clears the port opening defined by the annular port ring.

14. The method of claim 10, wherein releasing the rotated manually actuatable handle results in a spring linearly translating the axle of the manually actuatable handle through the annular port ring away from the isolated environment.

15. The method of claim 14, further comprising the annular port ring interfering with the axle to obstruct linear translation of the axle away from the isolated environment beyond a defined distance.

16. The method of claim 10, wherein linearly translating the axle of a manually actuatable handle through an annular port ring towards an isolated environment comprises compressing a spring between the handle and the annular port ring.

17. The method of claim 10, further comprising detaching a first axle portion of the manually actuatable handle from a second axle portion of the manually actuatable handle.

18. A port assembly comprising:
an annular port ring configured for placement in a barrier wall, the annular port ring defining a port opening extending from a first end to a second end and an annular sealing surface about the port opening on the second end;
a port cover mechanically coupleable to the annular port ring, wherein the port cover defines an annular mating surface configured to couple to the annular sealing surface of the annular port ring; and
a manually actuatable handle in mechanical communication with the port cover, where the handle extends from the first end of the annular port ring away from the second end;
wherein the annular port ring defines an axle pathway from the first end to the second end and the handle comprises an axle disposed in the axle pathway, wherein the axle is coupled to the port cover and the axle is rotatably disposed in the axle pathway, wherein the axle is linearly translatable along the axle pathway; and
wherein the annular port ring further comprises a translation pin extending into the axle pathway.

* * * * *